May 4, 1937.    W. J. JOHNSTON    2,079,070
GAUGE FOR DETERMINING CAMBER, CASTER, AND
KINGPIN INCLINATION OF AUTOMOBILE WHEELS
Filed March 23, 1936    2 Sheets-Sheet 1

INVENTOR
W. J. JOHNSTON
BY
Louis H. Cameau
ATTORNEY.

Patented May 4, 1937

2,079,070

UNITED STATES PATENT OFFICE 2,079,070

GAUGE FOR DETERMINING CAMBER, CASTER, AND KINGPIN INCLINATION OF AUTOMOBILE WHEELS

William J. Johnston, London, Ontario, Canada, assignor to Albert Speare Lashbrook, London, Ontario, Canada Application March 23, 1936, Serial No. 70,287
In Canada February 25, 1936

2 Claims. (Cl. 33—203)

My invention relates to a gauge for measuring the camber of a wheel as well as caster and king pin inclination. The steering wheels of automobiles are generally set at an inclination or pitch and while there is an approximate uniformity of the pitch in the trade, each manufacturer adopts a pitch or degree of inclination which he deems most desirable. It is, therefore, desirable to determine accurately whether the wheel is originally set at the selected pitch and whether, after use, it has maintained the set pitch or through wear or other causes, this pitch has varied. The present invention provides a very simple and efficient gauge by the use of which the pitch of the wheel may be accurately determined, that is, the camber, caster and king pin inclination.

My gauge has been developed with a view to the following improvements or advantages, over such known devices, namely, (1) A very simple construction, thereby providing a gauge which will be within the means of the average garage keeper, thus enabling frequent checking up of camber, etc.;

(2) Camber reading is taken from the hub on the bearings, instead of from the rim of the wheel or tire which may often be bent or bulged and thus result in inaccurate readings;

(3) A floor or elevated rack is dispensed with;

(4) The gauge could be used on an axle which has been dismantled from the chassis, by the addition of a centering rod and two cones, a modification which need not be shown.

The objects of the invention, therefore, are to improve on known gauges used for measuring camber, caster and king pin inclination.

In the drawings, wherein like numerals of reference indicate corresponding parts in the various figures, Figure 1 shows part of a wheel with my gauge in operative position;

Figure 1:
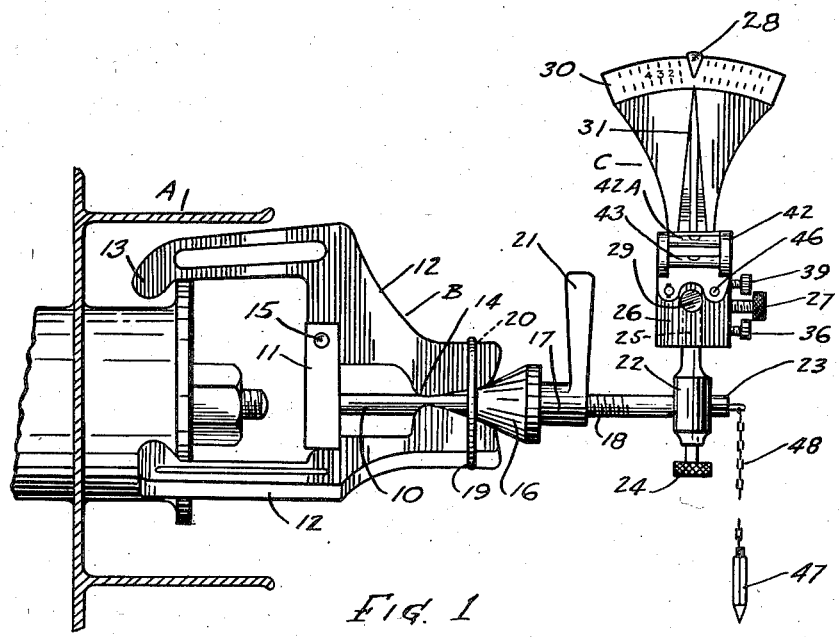
Figure 2:
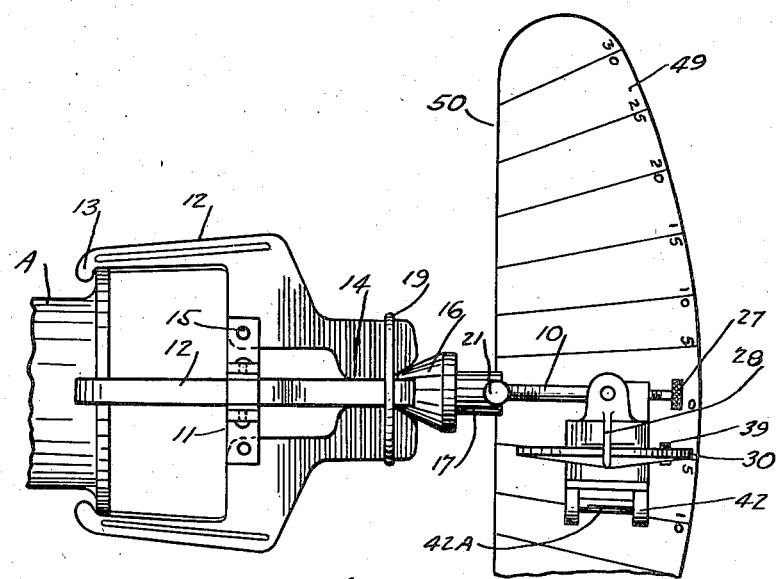
Figure 2 is a top plan view of Figure 1.

Referring now by numerals to the drawings, A indicates the hub of a wheel to which my gauge is applied. B indicates a mounting releasably secured at one end to the wheel hub and carrying at the other end, the gauge proper C.

10 is a spindle on the inner end of which are three hinge brackets 11. Pivotally mounted to each of these brackets, as at 15, is a member 12 formed at its inner end with a jaw portion 13 adapted to engage the edge of the hub. These three members form clamping means designed to retain the mounting B in its intended or operative position, the spindle being in alignment with the axis of the hub. The outer end of each member 12 is formed with a cam portion 14 adapted to be slidably engaged by the conical portion 16 of a nut 17 threaded on the threaded portion 18 of the spindle 10. A coil spring 19 tensioned around all three jaws or clamping members 12 retain the cam portions 14 in contact with the cone portion 16 of the nut, or to yieldingly resist the clamping action of the jaws, a groove 20 being provided in each of the jaws to receive the spring. By turning the nut 17, by the handle 21, to move the nut toward the hub, the jaws are caused to clamp the hub; an opposite movement of the nut will result in the jaws releasing the hub.

Figure 3:
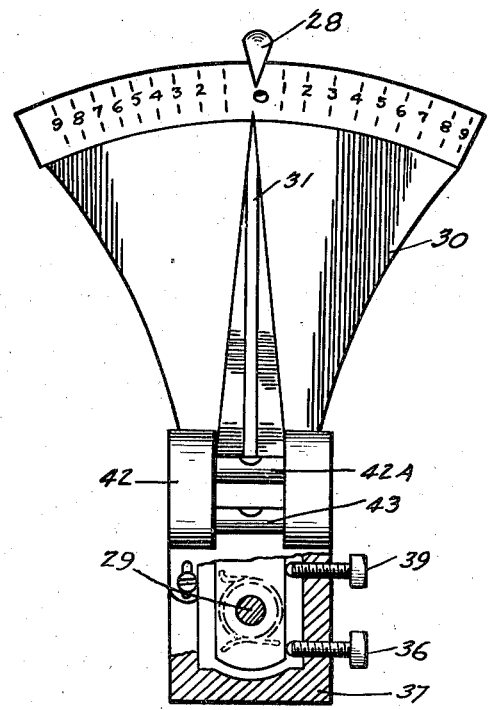
Figure 3 is a front elevation of the gauge proper, parts being broken away.
Figure 4:
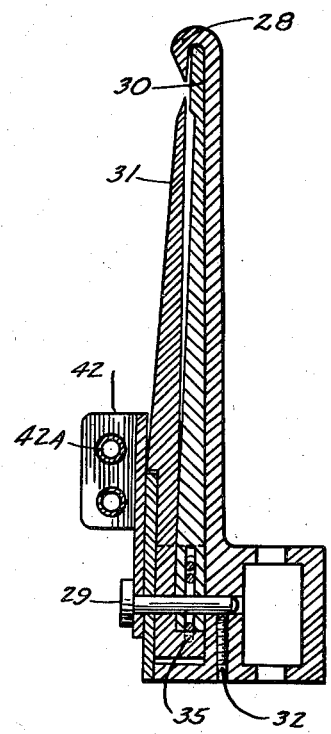
Figure 4 is a side sectional view of Figure 3.

The gauge proper includes an upright 22 apertured to receive the end 23 of the spindle 10. The upright is secured to the spindle end 23 by means of a set screw 24. The upper end 25 of the upright 22 is slidably received in a circular cavity or recess made into the block or body 26 of the gauge proper and is secured therein by means of a set screw 27. Rigid with or fixed to the block 26 is a pointer 28. Pivotally mounted to the block, as at 29, and forwardly of the fixed pointer 28, are a graduated dial 30 and a second pointer 31, the pointer co-operating with the dial, and the dial co-operating with the fixed pointer 28. Both the dial and pointer 31 are capable of turning on their common axis 29 which, as shown, takes the form of a pin held in position in the body 26 as with a screw 32, as best shown in Figures 3 and 4. The pointer 31 extends rearwardly below the dial as at 35, to be engaged by the end of an adjusting set screw 36 threaded through one side wall 37 of the body 26. This set screw, therefore, engages the pointer below its axis or pin 29. An adjusting set screw 39 is also threaded through the side wall of the body, vertically above the set screw 36, and engages the dial 30 above its axis or pin 29. By turning both screws in the same direction, the dial and pointer will thus swing or turn in opposite directions.

A spring 40 mounted between both pointer and dial urges said members in opposite directions so that the dial tends to exert a pressure upon the set screw 39, while the pointer 31 tends to exert a pressure upon the set screw 36. Secured to pointer 31 as with brackets 42, are two spirit levels or bubble gauges 42A and 43, these levels being in parallel but reversed relation so that one level may be used when the gauge proper is in an upstanding position, while the other level may be used when the gauge proper is in a depending or hanging position as a result of the wheel being tested having been turned through an angle of 180°. The bracket 42 mounting the two levels, and which is secured to the block 26 as with two screws 46, may be slotted on one side, that is, adjacent one of the screws, to permit of the bracket being adjustable to a slight extent.

From the end of the spindle 10 may be hung a plumb bob 47 by means of a chain 48. The plumb bob is adapted to co-operate with a large floor dial 49 which is graduated into degrees to determine the degree of rotation imparted to the steering wheel, as on a vertical axis. This floor dial has a straight edge 50 whereby the dial may be set parallelly with the vertical plane of the wheel when set in a straight-ahead position. The dial is preferably graduated from zero, at centre, to 30° in each direction away from the zero mark, as such gauges are usually based on a 60 degree extreme turn of the steering wheel when making caster and king pin inclination measurements.

Operation

*1. To measure camber.*—The gauge proper is set so that the dial 30 is at right angles to the wheel being tested and in a vertical position. The screw 36 is adjusted to center the level bubble in the upper level tube 42A and the screw 39 next adjusted to bring the zero mark on the dial in line with the pointer 31. The zero mark will now lie to one side of the fixed pointer 28 if there exists a camber, or if the fixed pointer is not at right angles to the axis of the wheel, or for both reasons, and a reading of the upper scale is noted. The four wheels of the car are now on the ground in the full ahead position. The car is next pulled ahead until the particular wheel being tested has revolved 180°, or one half turn. The gauge will now be upside down, with the spirit bubble tube 43 lying now uppermost. The screw 36 is again adjusted to level the bubble in tube 43, and the other screw 39 adjusted to bring the zero mark on the dial in register with the pointer 31. The zero mark will now be on the opposite side of the fixed pointer 28, a reading of the upper scale again being noted. The average of both readings will thus establish the camber in degrees.

Such readings may be checked against readings taken when the car is jacked up, and a comparison of the two sets of readings will show the existence of wear or play in king pins, bushings and bearings, such wear or play being expressed in terms of degrees. Care should be taken, in jacking up the car, that both sides of the axle are raised equally and not higher than is necessary to turn the wheels.

*2. To determine caster.*—Both wheels of the axle are jacked up just sufficiently to clear the ground. The car must be on level ground and both wheels raised an equal distance. The dial is set at right angles to the plane of the wheel when in straight ahead position. The steering wheel is turned until plumb bob 47 reaches 30° on floor dial 49. The screw 36 is adjusted to centre the bubble in tube 42A and the screw 39 adjusted to bring the zero mark on the dial in register with the pointer 31. The wheel is now turned in the opposite direction until plumb bob 47 reaches 30 degrees on floor dial 49 on opposite end and the screw 36 adjusted to centre the bubble. The amount of caster is now determined by reading on the lower scale.

*3. To ascertain king pin inclination.*—The operation followed is the same as in the case of a check up of caster, except that the dial is set with its plane parallel with the longitudinal axis of the car and not at right angles to the plane of the wheel when in straight ahead position. The large floor dial may be used here as in the case of the caster check-up, so as to carefully mark out an angular displacement of 60° of the wheel.

What I claim is:—

1. A tool for measuring the camber, caster and king pin inclination of an automobile wheel, comprising a spindle having hub-engaging means at one end adapted to hold said spindle in substantial alignment with the axis of the hub, a block on said spindle, a pointer fixed to said block at substantially right angles to the axis of said spindle, a member such as a graduated dial pivotally mounted to said block and co-operating with said fixed pointer, a second member such as a pointer pivotally mounted to said block and co-operating with said dial, separate means for adjusting the positions of said members, and a bubble gauge carried by one of said members.

2. A tool as set forth in claim 1, wherein said bubble gauge is carried by said pivotally mounted pointer.

WILLIAM J. JOHNSTON.